United States Patent [19]

Hollinger

[11] Patent Number: 4,504,248
[45] Date of Patent: Mar. 12, 1985

[54] VARIABLE AND REVERSIBLE TRANSMISSION

[76] Inventor: John D. Hollinger, 10428 Winston Ln., Indianapolis, Ind. 46256

[21] Appl. No.: 423,539

[22] Filed: Sep. 27, 1982

[51] Int. Cl.³ ............................................. F16H 55/56
[52] U.S. Cl. ...................................... 474/24; 474/29; 474/37; 474/166
[58] Field of Search ................. 474/1, 8, 24, 148, 166, 474/29, 37, 38, 39, 40, 41, 42; 74/198

[56] References Cited

U.S. PATENT DOCUMENTS

| | | | |
|---|---|---|---|
| 1,793,571 | 2/1931 | Vaughn | 74/198 |
| 2,737,820 | 3/1956 | Collar | 74/198 |
| 3,333,479 | 8/1967 | Shields | 74/198 |
| 3,800,606 | 4/1974 | Schott | 74/198 |

Primary Examiner—James A. Leppink
Assistant Examiner—Mark J. DelSignore
Attorney, Agent, or Firm—Woodard, Weikart, Emhardt & Naughton

[57] ABSTRACT

A variable and reversible transmission, in which two co-linear shafts are provided with adjustably-locatable generally semi-spherical drive components or heads, with control means for changing and holding selected adjustments of the heads; and the heads drivingly engage one another, in whatever settings they are positioned, by acting through a pulley belt which may be either an idler for only transmitting torque from one head directly to the other, or may be a power member transferring power to another set of such heads, achieving both variability and reversibility of drive.

5 Claims, 7 Drawing Figures

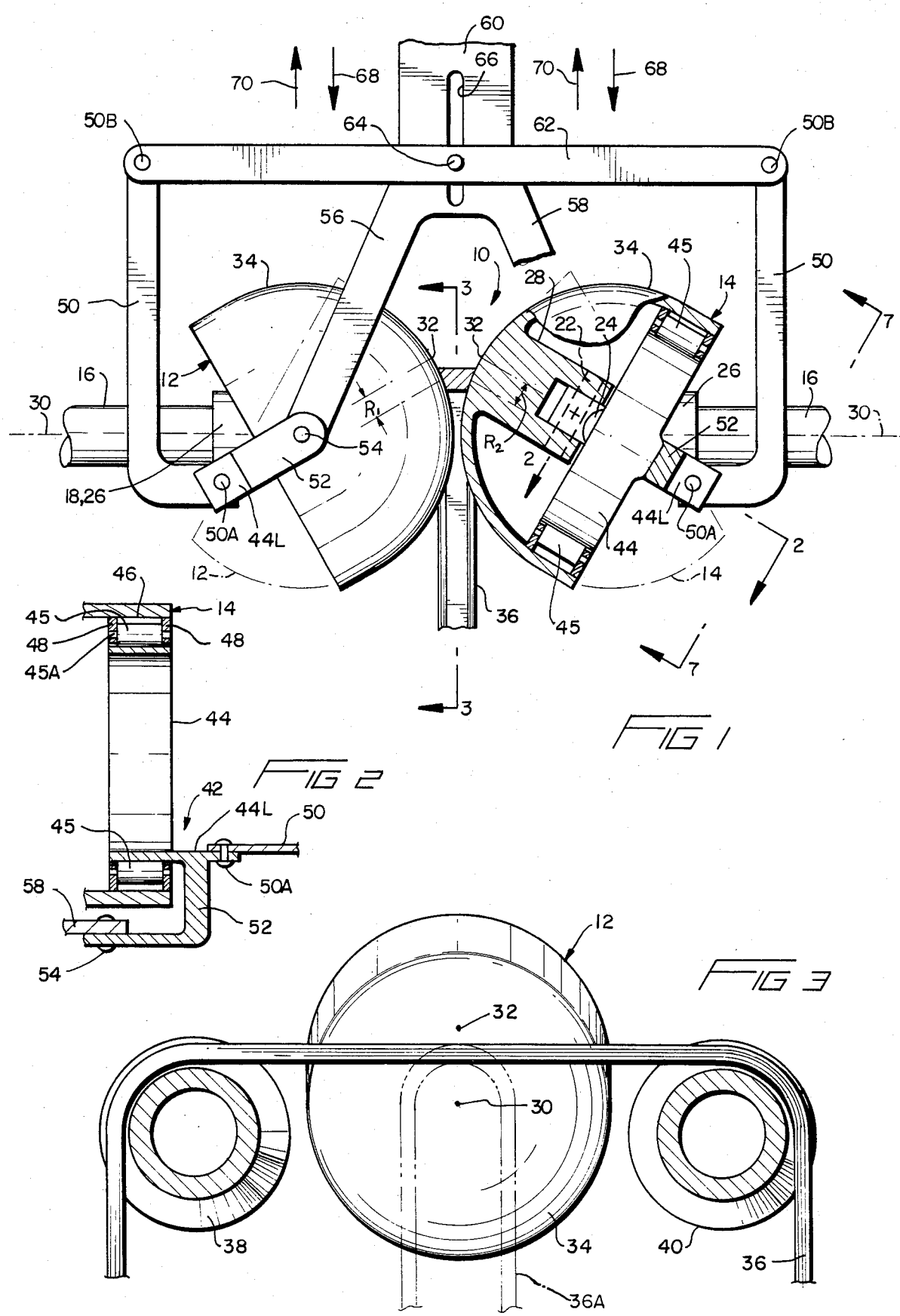

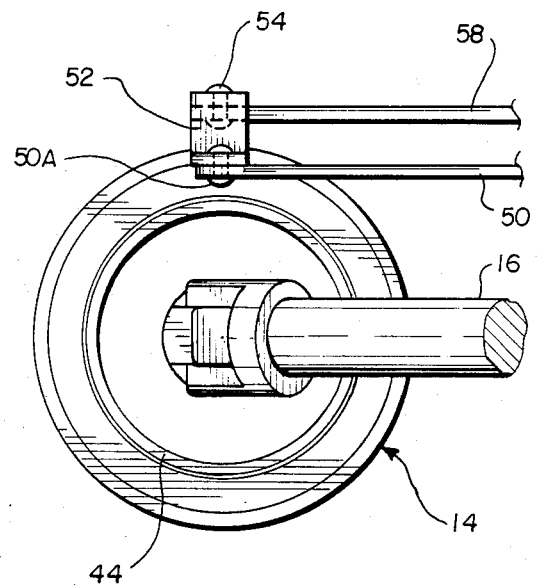

VARIABLE AND REVERSIBLE TRANSMISSION

The present invention relates to a drive means or mechanism for transmission of power from one shaft to another, and the novel concepts provide a transmission providing both variable and reversible drive characteristics.

In contrast to prior art systems achieving variable speed and reversibility of transmission, the present invention provides a variable transmission means having a pair of generally semi-spherical drive heads or components, with a swivel connection to their respective drive shafts, permitting relatively positioning the drive components with respect to their respective drive shaft such that the centerpoint of the surface of the drive members is optionally fixed, selectively in line or out of line with the axis of the respective shaft; and a pulley belt is provided, as are means movably supporting the pulley belt, so that the pulley belt drivingly engages the drive heads to achieve a driving although movable interconnection of them.

However, quite in contrast to conventional use of a pulley belt, its use here, in its engagement of each of the drive components, is with the pulley belt at the same location along the pulley belt although on opposite sides thereof, at that same location along the pulley belt.

Control means provides for moving and holding the drive heads or components relatively to their respective drive shafts such that the centerpoint of the surface of the drive components is optionally held to be a selected amount in line or out of line with the axis of the respective drive shafts; and the generally semi-spherical nature of the drive components, and their swivel connections to their respective shafts through the axes thereof, provide that their surface-portions are selectively juxtaposed and drivingly contacted by the pulley belt for transmission of power, with variable drive and reversible drive characteristics, as set forth more fully herein.

The prior art has considered variable speed drive transmissions for many years, seeking by one form or another to provide variable speed mechanisms; for such mechanisms are said in a relatively old text to "play an important and indispensible role in modern industry. They are widely employed to regulate feeds and speeds, for example: annealing furnaces, assembly conveyors, automatic welders, cement kilns, inspection tables, metering systems, printing presses, pumps, stokers, traveling bread ovens, and wire-coiling machines." (Faires, *Design of Machine Elements*, 4th Ed., p. 462 (The MacMillan Company, New York, 1965)).

Modern continuously variable transmissions are an outgrowth of fixed pulleys. Two fixed-size pulleys could transmit power from a source to a driven output; and it was early discovered that one could increase the speed (and thus reduce the torque), or vice versa, by selecting the variation in size of pulleys as desired. This was suitable for certain applications, but was not practical if it was desired to change the ratios from time to time.

The desire to change ratios, accordingly, evidently was what led to the development of the step pulley, by which speed ratios could be changed by increments. In use of such step pulleys, by turning off the machine or by otherwise forcing the belt to "jump" from one size pulley to the next step, different ratios could be obtained in a relatively short and easy manner. The use was still restricted, however, in that there were certain speeds or steps that had to be skipped in between the fixed ratio sizes of the pulley.

This problem of step-type increments of variability of speed ratios then led to the development of the continuously variable transmission. Quoting from *Mechanics of Machinery* (p. 62), "One of the best-known devices for accomplishing variable-speed transmission through the use of a belt is the Reeves variable-speed transmission. It consists essentially of a pair of pulleys connected by a V-shaped belt. Each of the pulleys consists of a pair of beveled disks (cones) keyed to the shaft so that disks and shaft must turn together but the disks are free to be moved along the shaft. By means of suitable adjusting devices the two conical disks on one shaft are caused to approach each other at the same time that the two disks on the other shaft separate. Bringing the two disks nearer together causes the V-shaped belt to be in contact with them farther out from the axis, and separating them causes the belt to be in contact nearer the axis. Thus, the effective radius of one pulley is increased at the same time that the effective radius of the other pulley is decreased." (*Mechanics of Machinery*, 4th Ed., p. 62 (McGraw Hill, New York, 1958))

The same reference continues: "Variable-speed transmission in the case of the chain drive may be secured by a device similar to that described above for the V-shaped belt. One such device known as the PIV (positive, infinitely variable) gear consists essentially of a V-shaped link chain with teeth on the sides that engage with radial teeth in a pair of axially adjustable conical disks on the driving and driven shafts. Each pair of disks thus becomes an adjustable-diameter wheel in the transmission of power, so that an infinite number of speeds between the minimum and maximum are available."

Thus the prior art has provided a variety of types of devices, for obtaining a speed variability by achieving different radii of pulley belt engagement.

The more complex devices, such as the basic Reeves transmission, to quite complex devices such as one written up in Popular Science, p. 88 (June 1980) seem to be quite an improvement over the fixed and step pulleys, by avoiding the incremental and hard-to-change variability of such earlier devices; however there are still some serious limitations or disadvantages:

1. The disks (cones) and shaft turn at the same speed so that a different speed on each side of the output shaft is not possible. Certain applications such as an automobile transmission make such a differential desirable when turning a corner to slow down one output wheel while the other goes faster.

2. A reversing is not possible unless the input shaft is reversed. This is an added expense and inconvenience to get a power source that reverses or has a clutch and a gear to reverse the input shaft.

3. The speed-ratio variation of apparently all seems to be dependent upon a change of effective radius of belt engagement, that is, the radial length between the shaft axis and the location of belt-engagement.

In contrast the present invention achieves reversibility as well as speed-ratio variation by different means, as herein specified.

Accordingly, although the prior art has long struggled with the problem and needs of an effective transmission to provide variable drive and reversible drive, and in spite of the many years and the many attempts throughout those years, and in spite of the long-existing need for an effective transmission of this nature, none has provided nor suggested the concepts by which the characteristics of the present invention have been achieved; and thus none of the prior art has achieved singly, and even more certainly in combination, the particular advantages of variable and reversible transmission or drive of the present invention and the advantageous construction concepts of the invention.

The above description is of an introductory and generalized nature, particularly to mention the general objects and achievements and desirability of the present invention.

More particular and specific concepts, features, advantages, and details are set forth in the following more detailed description of an embodiment illustrative of the invention's concepts, taken in conjunction with the accompanying drawings.

In those drawings, which are somewhat schematic and diagrammatic in nature, it will be noted as follows:

FIG. 1 is a view partially in cross-section, of a variable and reversible transmission or drive means, according to the inventive concepts, illustrating two of the semi-spherical drive component head members and a drive pulley belt, the drive components being shown in a setting or relative position relative to their drive shafts in which the two drive components will revolve at the same rotational speed, regardless of which of them or the belt is the driver component; and in FIG. 1, the chain-line representation of the drive components illustrates their position at an opposite setting, which would be substantially like that of FIG. 4;

FIG. 2 is a cross-sectional view taken at line 2—2 in FIG. 1 illustrating control means by which the drive component members are moved and held in desired positions relative to their respective drive shafts for achieving the desired variation of rotational speed, variation of their relative rotational direction, and variation of relative speed of pulley belt travel;

FIG. 3 is a view taken generally as indicated by View-line 3—3 of FIG. 1, the belt in solid lines being shown as drivingly engaging one of the semi-spherical drive components, and a pulley belt shown in chain lines without the two idlers in a situation in which it is desired to achieve more engagement of the pulley belt and semi-spherical drive components;

Figure 4:
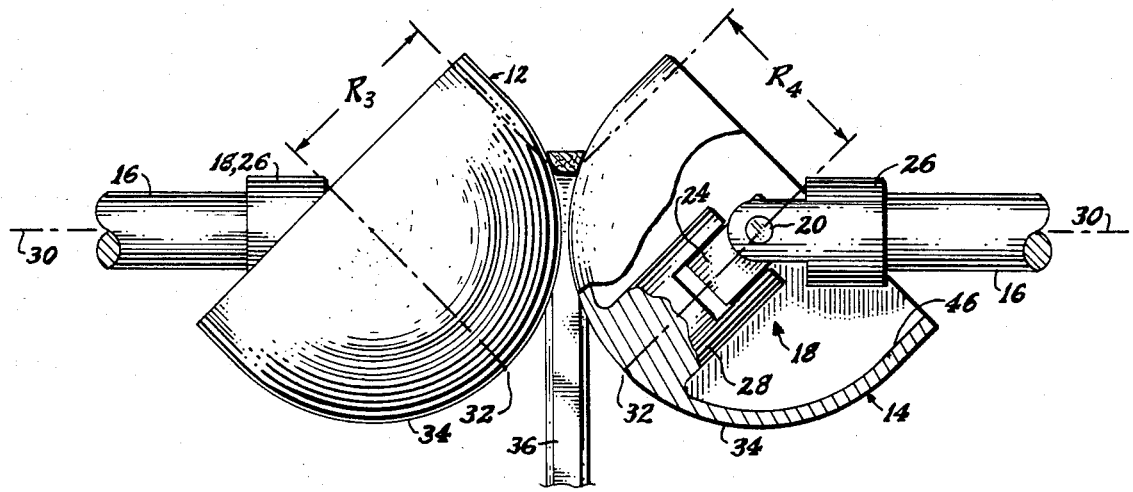
FIGS. 4–6 are views similar to FIG. 1, and more particularly.
Figure 5:
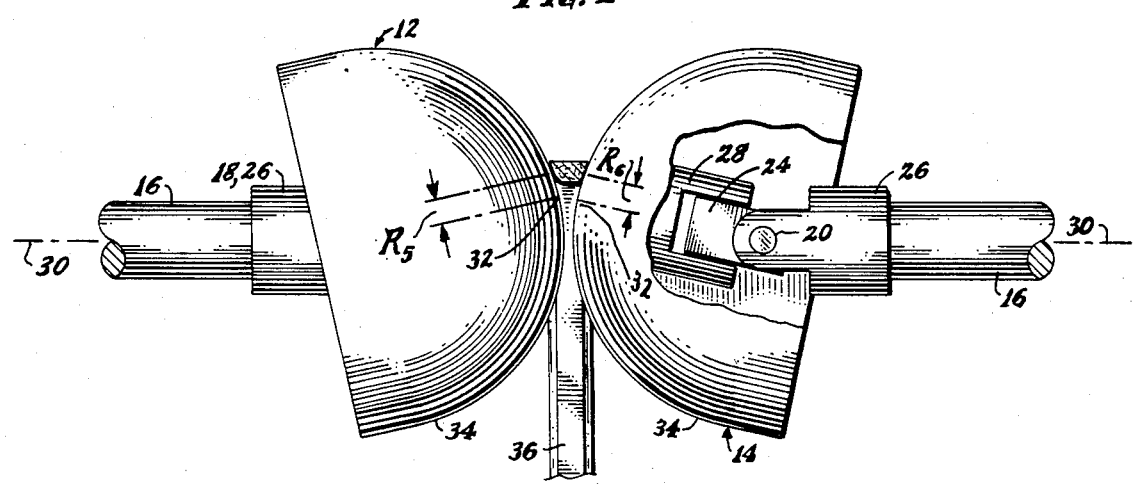
Figure 6:
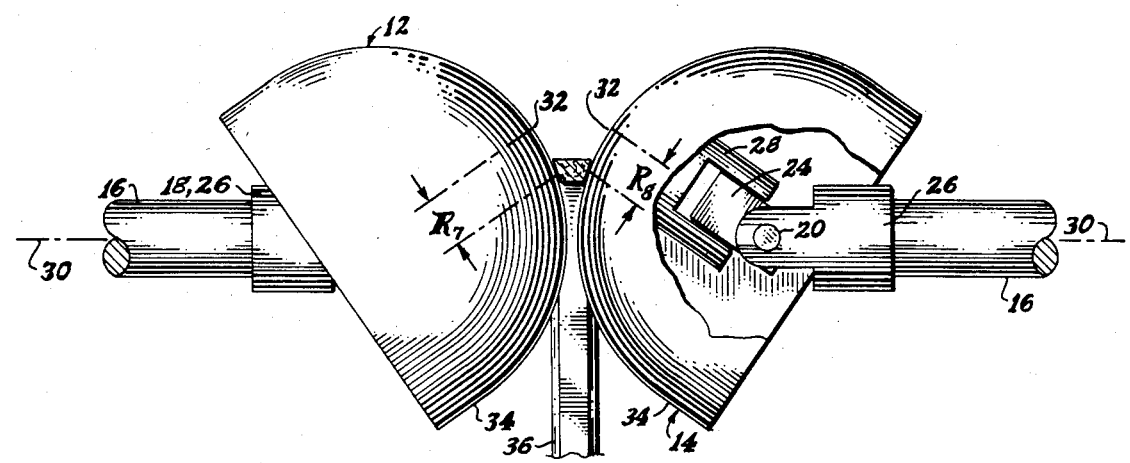

FIG. 4 shows the two semi-spherical drive components being held in a relative position such that the pulley belt would have a faster speed relative to that of FIG. 1, and in the direction opposite to that of the belt of FIG. 1, even though the semi-spherical drive components would be travelling in the same direction as in FIG. 1, but with the drive components nevertheless having the same relative rotational speed with respect to one another;

FIG. 5 shows a setting of the two drive components such that the belt would have a much slower speed than in FIG. 4, even though the drive components be travelling at the same rotational speed as in FIG. 4, and with the pulley belt travelling in the same direction as in FIG. 4, assuming rotation of the drive components to be the same in FIGS. 4 and 5;

FIG. 6 shows the parts in a setting generally like that of FIG. 1, except that in FIG. 6 the speed of the pulley belt relative to the rotational speed of the drive components and their drive shafts is relatively faster than in FIG. 1; and, FIG. 7 is a fragmentary right side elevational view disclosing the interior of one of the hemispheres.

As shown in the drawings, the inventive concepts provide a novel and advantageous variable transmission means 10, the most prominent parts of which are a pair of generally semi-spherical drive head components 12 and 14.

A drive shaft 16 is connected to each of the drive components 12-14 by a swivel joint 18, and in FIG. 4, here shown as a so-called "universal joint" with mutually perpendicular swivel pins 20-22 carried by an intermediate link member 24, the outer ends of the pins 20-22 being respectively held by yokes or bifurcated ears respectively on a bushing 26 fixed on the shaft 16 and on a boss 28 internally of the semi-spherical drive components 12-14.

It will be noted that the connector pins 20 each pass through the axis 30 of the respective shaft 16; and this concept permits relatively positioning the drive components 12-14 with respect to their respective drive shaft 16 such that the centerpoint 32 of the surface 34 of the drive members 12-14 is optionally positionable either in line or out of line with the axis 30 of the respective shaft 16.

A pulley belt 36 is provided, and means such as idlers 38-40 are shown as supporting the pulley belt 36 so that the pulley belt 36 drivingly engages the semi-spherical drive components 12-14 to achieve a driving although movable interconnection of those two drive components 12-14 by their engagement with the pulley belt 36. Their contact with the belt 36 is not at points spaced along its length, but instead is although on opposite sides thereof, at the same location along the pulley belt 36.

Somewhat schematically there are shown control means 42 for moving and holding the drive components 12-14 relative to their respective drive shafts 16 such that the centerpoint 32 of the surface 34 of the drive components 12-14 is optionally held to be a selected position either in line or out of line with the axis of the respective drive shafts, as may be noted by the differences in the various dimensions $R_1$, $R_2$, $R_3$, $R_4$, $R_5$, $R_6$, $R_7$, and $R_8$ of the drawings, and as detailed below.

It is the generally semi-spherical nature of the drive components 12-14 and their swivel connections 18 to their respective shafts 16 through the axes 30 thereof, which provide that as the drive components 12-14 are moved into and held in various selected positions with respect to the alignment and non-alignment of the centerpoint 32 of their surfaces 34 with reference to the axis 30 of their respective shafts 16, their surface-portions 34 are juxtaposed and are spaced from one another only such a small distance that the pulley belt 36 drivingly contacts both of the drive components 12-14 at the same location along the pulley belt 36 although on opposite sides thereof at the pulley belt location.

The control means 42 is used for moving and holding the drive components 12-14 relative to their respective drive shafts 16, such that the centerline 32 of the surface 34 of the drive components 12-14 may be optionally held to be a selected amount either in line or out of line with the axis 30 of the respective drive shaft 16. It includes a generally cylindrical support member 44 which serves as an inner race for an array of circularly spaced bearing rollers 45 having their shafts 45A mounted in bearing roller mounting rings 48 secured to the inner walls 46 of the drive components 12-14. A linkage schematically indicated at 50 may be of whatever form is desired to achieve the desired positioning of the supports 44 and the heads 12-14. For example, the lugs 44L projecting from cylinders 44 have arms 52 fixed thereto and projecting around the outside of members 12 and 14 and toward the belt. These are pivotally mounted as at pins 54 to fixed arms 56 and 58 of a stationary support frame 60.

The upper ends of links 50 may be pinned to a beam 62 having a pivot pin 64 received in slot 66 in frame 60. Each of the pivot pins 54 has its axis on a line passing through the shaft axes 30 at 90 degrees thereto and through the center of the spherical surface 34.

To change belt speed, the beam 62 is simply moved in the direction of arrow 68. To change belt speed and then direction and then speed again in the opposite direction, the beam is moved in the direction of arrow 70. To reverse the direction of member 14 relative to 12, the beam is rocked about pin 64, whose axis is parallel to those of pins 54, 50A and 50B. The reasons for change of speed, and reversal of belt direction, will now be more fully described.

With respect to the settings of the drive members 12-14 relative to their shafts 16, it will be noted that the swivel joint connection 18 is such as to permit the drive components 12-14 to be adjustably held in positions (by controls 42) in which their centerpoints 32 are located such that an imaginary line through the centerpoints 32 would selectively be or would not be parallel to the axes 30 of the drive shafts 16; and further, the portion of the pulley belt 36 which is drivingly engaged to the drive components 12-14 is selectively on either side of an imaginary line through those centerpoints 32, having reference to the axes 30 of the shafts 16, even though at the same region with respect to the axes 30 of those shafts 16.

For example, in FIG. 1, if member 12 is the power input member, and member 14 is the power output member, and belt 36 engages both at a radius $R_1 = R_2$ and below a line connecting the centerpoints 32, the output member is 14 driven by input member 12 at the same speed and in the same rotational direction as the input member. A line connecting the centerpoints 32 would be parallel to the axes 30 of the drive shafts. In contrast, if member 14 is pivoted downward toward the chain line in FIG. 1, while the input member 12 is held in the attitude shown in solid lines, the speed of the output member 14 will increase until $R_2$ becomes so small that slippage begins. Then the output member 14 speed will quickly decrease until it stops as its centerpoint centers on the belt at a point opposite the contact point of member 12 with the belt. As output member is further pivoted or tilted downward, it will begin to turn in a direction opposite input member 12. It is in "reverse". Now a line connecting the centerpoints 32 would not be parallel to the shaft axes 30. As member 14 is further tilted after any belt slippage has stopped, its speed will decrease. When $R_2$ again equals $R_1$, the speed of output member 14 will be the same as input member 12, but in the direction opposite that of input member 12.

Thus although all the Figures show settings of similar adjustment of both of the members 12-14, they may set in different settings to achieve whatever relation of rotational speed and torque is desired as between the two members 12-14 and their shafts 16.

As with other situations of differences of rotational speeds, the variableness of the rotational speeds could also be expressed as variability of torque, according to the principle that torque is inversely proportional to rotational speed.

Further, it should be noted that the devices of the drawings are only illustrative of the concepts relating to each pair of the drive components 12-14; and thus more than two may be used in certain transmissions, and the drive may be through the pulley belt 36 to other sets of members 12-14 rather than the pulley belt 36 being just an idler except as it transmits the energy of one of the members 12-14 to the other as shown in the illustrative examples.

With all the above discussion in mind as to concepts and details of the embodiments shown in the drawings, further details of distinction between the views, and the operativity of the invention's concepts, may be now more easily understood, again looking to those Figures.

That is, in FIG. 1, it will be noted that the variable and reversible transmission means (considering the solid line showing) illustrates the two semi-spherical drive component head members 12-14 and a pulley belt 36 in a setting or relative position relative to their drive shafts 16 such that the two drive components will revolve in the same direction at the same rotational speed, regardless of which of the heads 12-14 or the pulley belt 36 is the driver component; for both heads are at the same angle with respect to their shafts 16, and on the same side from the shafts (i.e. above them), and with the "R"-distances (the distance between the contact of belt 36 on surface 34) the same, i.e., $R_1$ the same as $R_2$. An imaginary line interconnecting the centerpoints 32 is above the portion of pulley belt 36 which is drivingly engaged to the members 12-14, and is parallel to the shaft axes.

Also, in FIG. 1, the chain-line representation of the drive components 12-14 illustrates their position at an opposite setting, being substantially like that of FIG. 4, whose operational characteristics are described below.

In FIG. 3, an alternate position 36a of the pulley belt is shown, as would be in a situation without the use of the two idlers 38-40, i.e., in a situation in which it is desired to achieve more engagement of the pulley and semi-spherical drive components 12-14, and the lower portion of the belt 36a would be wrapped around either an idler or drive pulley belt (not shown) depending upon the desired use.

FIG. 4 differs from FIG. 1 in that in FIG. 4 the two semi-spherical drive components 12-14 are shown as being held in a relative position such that the pulley belt 36 would have a faster speed relative to that of FIG. 1, because $R_3$ and $R_4$ (although equal) are greater than $R_1$ and $R_2$ of FIG. 1. Also, since an imaginary line through centerpoints 32 is below the portion of pulley belt 36 which is drivingly engaged to members 12-14, the pulley belt 36 in FIG. 4 would be driven in the direction opposite to that of the belt 36 of FIG. 1, even though the semi-spherical drive heads 12-14 would be travelling in the same direction and same speed as in FIG. 1.

In FIG. 5, there is shown a setting of the two drive heads 12-14 such that the belt 36 would have a much slower speed than in FIG. 4, even though the drive heads 12-14 be travelling at the same rotational speed as in FIG. 4, and with the belt 36 travelling in the same direction as in FIG. 4, assuming rotation of the drive components to be the same in FIGS. 4 and 5; and this slower pulley speed is because $R_5$ and $R_6$ are smaller than $R_3$ and $R_4$.

Lastly, FIG. 6 shows the parts in a setting generally like that of FIG. 1, except that in FIG. 6 the speed of the pulley belt 36 relative to that of FIG. 1 for the same rotational speed of the drive components 12-14 and their drive shafts 16 as in FIG. 1, is relatively faster than in FIG. 1, as is shown by $R_7$ and $R_8$ being each slightly more than $R_1$ and $R_2$.

The above description has demonstrated that variable speed belt drive, whether the drive input comes from one of the heads 12-14 or from the belt 36, is achieved by setting the heads 12-14 at different angles from their shafts 16, the heads 12-14 thus having different "R"-values; for in that situation, the spot-engagement of the portion of the belt 36 engaging the heads 12-14 at any time will be at a different location of surface 34 with respect to the head centerpoint 32 and thus a different circumferential length of travel of that spot around the shaft-axis 30. In effect, it is in that respect somewhat similar to the infinite variability of drive speed achieved by the above mentioned Reeves-type beveled disks (cones) permitting driving engagement with a pulley belt at various radial dimensions with respect to the axis of the cones.

The above description has also shown that belt-to-shaft drive reversibility is achievable by the invention. Even at the same speed of the heads 12-14, and even with the same position of the pully belt 36 with respect to shaft axes 30 in both instances, the full-line positions of the heads 12-14 in FIG. 1 will achieve a different direction of rotation of the pulley belt from that produced by the chain-line positions, because the "R"-distances in the two positions are on opposite sides of the head members' centerpoints 32.

Reversibility of drive from one head 12-14 to the other, can also be achieved. For example, consider a setting such as in FIG. 1 but with only the head 14 set into the chain-line position. By setting the heads 12-14 oppositely in the sense that the "R" distance of one head 12-14 (in this instance the distance $R_1$ of head 12) would be on one side of (here below) the surface centerpoint 32 of that head whereas the other head (here head 14) would be set with its "R" distance on the other side of (here above) the surface centerpoint 32 of that other head, rotation of one head will cause the other head to rotate in the opposite direction. Also, if the belt is used as the power input, it will drive the heads in opposite directions.

Various other settings, other than merely those set forth here to illustrate the concepts, will be obvious, providing infinite variations of speed and also reversibility of drive, regardless of the direction and particulars of the drive transmission.

It is thus seen that a variable and reversible transmission, according to the inventive concepts of one or more sets of special drive components with a drive-transmitting pulley belt, set forth provides a desired and advantageous device or system, yielding advantages over prior transmissions.

Accordingly, it will thus be seen from the foregoing description of the invention according to this illustrative embodiment, considered with the accompanying drawings, that the present invention provides new and useful combination concepts of a novel and advantageous variable and reversible drive transmission, yielding desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

What is claimed is:

1. A variable transmission means, comprising:

a pair of generally semi-spherical drive head components;

a drive shaft connected to each said drive component by a swivel joint having as one of its connections a connector passing through the axis of said shaft, and permitting relatively positioning the drive components with respect to their respective drive shaft such that the centerpoint of the surface of the drive members is optionally in line or out of line with the axis of the respective shaft;

a pulley belt, and means movably supporting the pulley belt so that the pulley belt drivingly engages the said drive components to achieve a driving although movable interconnection of the two drive components by engagement of each of the drive components with the pulley belt at the same location along the pulley belt although on opposite sides thereof at said location along the pulley belt;

there being control means for moving and holding the drive components relative to their respective drive shafts such that the centerpoint of the surface of the drive components is optionally held in line or a selected amount out of line with the axis of the respective drive shafts;

the generally semi-spherical nature of the drive components, and their swivel connections to their respective shafts through the axes thereof, providing that, as they are moved into and held in various positions with respect to the alignment and non-alignment of the centerpoint of their surfaces with reference to the axis of their respective shafts, their surface-portions are juxtaposed and are spaced from one another only such a small distance that the pulley belt drivingly contacts both of said drive components at the same location along the pulley belt although on opposite sides thereof at the pulley belt location.

2. The invention as set forth in claim 1 in a combination in which the control means, for moving and holding the drive components relative to their respective drive shafts such that the centerline of the surface of the drive components may be optionally held in line or a selected amount out of line with the axis of the respective drive shaft, is provided by a generally cylindrical support member operatively engaging in a movably but supporting manner, bearing means on the interior wall of the respective drive component.

3. The invention as set forth in claim 2 in which there is provided a bearing raceway between the supportingly interengaging portions of the drive components and the generally cylindrical support member of the control means.

4. The invention as set forth in either of claims 1 or 2, in a combination in which the swivel joint connection is such as to permit the drive components to be adjustably held in positions in which their centerpoints are located such that a line interconnecting the centerpoints would selectively be or would not be parallel to the axes of the drive shafts.

5. The invention as set forth in either of claims 1 or 2, in a combination in which the swivel joint connection is such as to permit the drive components to be adjustably held in positions in which their centerpoints are located such that the portion of the pulley belt which is drivingly engaged to the drive components is selectively on either side of a line interconnecting said centerpoints, having reference to the axes of the shafts, even though at the same region with respect to the axes of those shafts.

* * * * *